Patented Oct. 11, 1938

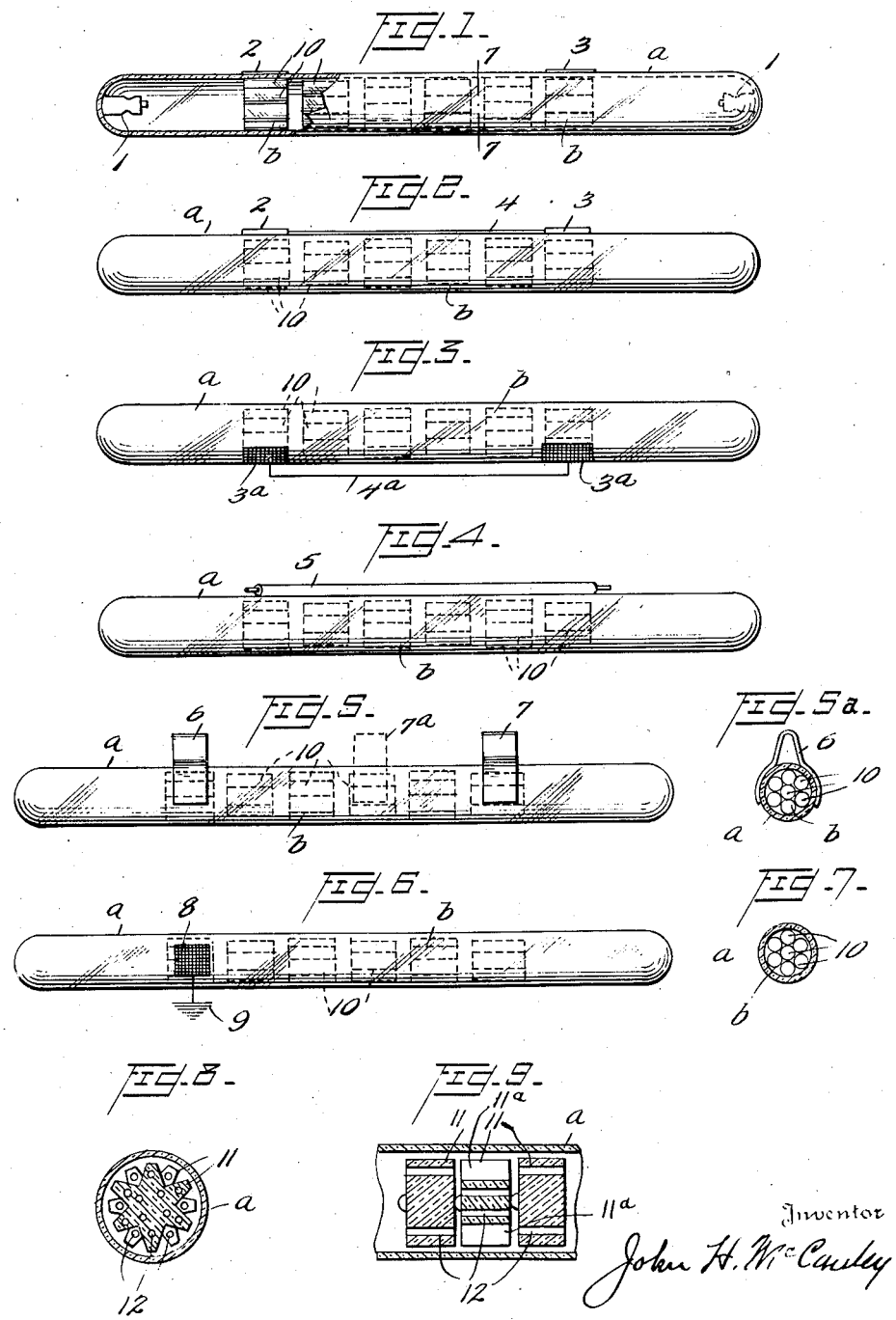

2,132,427

UNITED STATES PATENT OFFICE 2,132,427

ELECTRICAL DISCHARGE DEVICE

John H. McCauley, Hillside, N. J.

Application January 23, 1936, Serial No. 60,496

23 Claims. (Cl. 176—122)

This invention relates to improvements in electrical discharge devices of the kind commonly used for illuminated signs and other purposes, consisting of a closed glass tube containing a gas or vapor, or both, through which a high tension electrical discharge is passed to produce a luminous effect. In my application, Serial Number 691,551, filed September 29, 1933, I have shown such a device in which a part of the tube contains a filler of insulating material which causes the discharge to take a tortuous course through the tube and affords a plurality of paths for the discharge, and in the operation of that device the course of the discharge through that part of the tube containing the filler constantly shifts, owing to changes in the resistance of the gas due to heating, the current taking the course of least resistance.

The present invention applies to tubes of the kind referred to in the aforesaid application and embodies means external to the tube for controlling the shifting of the current and luminous lines in the tube, this means consisting of what might be termed an external capacity circuit which affects the electrical charge passing through the tube. In carrying out the invention, I apply in close proximity to or in actual contact with the exterior surface of that portion of the tube containing the filler, an electric conducting material, preferably, though not necessarily, of high conductivity, the size or area of the conducting material and its location varying with the requirements of individual tubes.

The conducting material may be applied in the form of a coating over the entire outer surface of that portion of the tube containing the filler, or over certain areas only, or the conducting material may consist of metal and may be applied to the tube in various ways. It may be desirable in some cases to connect this material to ground. In operation, the conducting material being applied to certain areas of the tube, an immediate change is observed in the shifting action of the luminous lines of light. The action may be greatly accelerated or possibly retarded, as may be desired, depending upon the areas to which the conducting material is applied. Also the shifting action may be started in sections of the tube in which there has been little or no action before, and since the purpose of the filler is to obtain movement of light, the usefulness of the invention, in stimulating, in retarding, or in initiating movement in tubes which might not otherwise work satisfactorily will be evident. By the application of the conducting material to the outer surface of the tube, a capacity circuit is constructed, the wall of the tube acting as the dielectric and the outer conducting material and the electrified gas forming the two conducting mediums of a condenser. The external capacity circuit affects the electrical charge present in the area to which it is applied, while the current is flowing.

In the accompanying drawing, I have shown discharge tubes with the external electrically conductive medium variously arranged, for the purpose of illustration. In the drawing, Fig. 1 shows in side view and partly in longitudinal section a luminous electric discharge device containing a filler and having relatively small areas at the ends of the portion of the tube containing the filler coated with an electric conductive medium;

Fig. 2 is a side view of a tube with the conductive coating extending from end to end of the portion of the tube containing the filler;

Fig. 3 is a similar view of a tube with patches of metal screen at the ends of the part of the tube containing the filler, with a wire connection linking the patches;

Fig. 4 is a similar view of a tube with an insulated conductor extending along the portion of the tube containing the filler;

Fig. 5 is a similar view of a tube with metal clips which may be adjusted to various points in the length of the tube; and Fig. 5ª is a cross-section through the same;

Fig. 6 is a similar view of a tube with a single patch of wire screened and a ground connection;

Fig. 7 is a section on the line 7—7 of Fig. 1, showing the tubular filler;

Fig. 8 is a section through a tube containing glass filler pieces of geometric design, and, Fig. 9 is a longitudinal section through part of the tube with the same filler as in Fig. 8.

Referring to Figs. 1 and 7 of the drawing, a represents a closed glass tube containing a rare gas and having the electrodes 1 in its end portions, and in the space between these electrodes is arranged a filler b which affords a plurality of devious paths for the electrical discharge, the filler in this instance being shown as short pieces 10 of glass tubing arranged in groups, or units, the tubes in successive groups being out of alinement with one another. When the device is connected to a transformer, the electric discharge follows the course of least resistance, passing through or past tubes in the successive groups and shifting laterally to other tubes in the groups, the luminous gas having the appearance of shifting streams of light. The action is the same as that described in my aforesaid application in which various forms of filler are shown. The shifting action is believed to be due to a change in resistance of the gas when heated. Thus when the current is turned on, the discharge takes a tortuous course through the filler and the resistance of the gas on that course instantly increases and the course of the current changes frequently at various points throughout the length of the filler in seeking a path of least resistance. In the end portions of the tube, between the filler and the electrodes, a steady glow which fills the tube is maintained.

I have found that by taking hold of the tube by the thumb and finger, at one or both ends of the portion containing the filler, the shifting of the light streams is affected, probably due to the conductivity of the body, and by changing the positions of the thumb and finger contacts with the tube, the shifting action of the discharge through the tube may be accelerated or slowed down. The positions of the fingers for greatest acceleration will vary with different tubes, depending somewhat upon the form and arrangement of the parts composing the filler and the natural course or courses which the discharge takes through the filler without the finger contacts.

In Fig. 1, I have shown at 2 and 3 relatively small areas of the tube, at the ends of the portion containing the filler, coated with electrically conductive material. The visible effect of the application of these patches of conductive material in the areas which they cover is to repel the luminous lines, and the effect throughout the tube is to accelerate the shifting of the current and the luminous lines.

In Fig. 2, the coatings 2 and 3 are shown connected by a coating 4 of conductive material. The visible effect is the attraction of the luminous lines toward the coating and acceleration of the shifting action of the luminous lines throughout the filler. The coating may be a metallic paint or any suitable conductive compound and it may be of high or low resistance, but preferably the latter.

In Fig. 3, patches 3ª of fine wire mesh screen are attached to the tube at the ends of the portion containing the filler, and these are connected by conductor 4ª spaced from the tube. The visible effects are the same as in Fig. 2.

In Fig. 4, an insulated wire 5 is shown extending lengthwise of the tube on that portion containing the filler. The wire does not touch the tube, but the visible effects are the same as described in connection with Figs. 2 and 3. This view is to illustrate the point that the conductor need not be in actual contact with the tube but may be spaced a short distance from it, as by the insulation surrounding the wire.

In Fig. 5, adjustable metal clips 6 and 7 are shown applied to the tube at the ends of the portion containing the filler. The visible effects are the same as with the separated coatings in Fig. 1. The clips may be adjusted to find the critical points of contact with the tube at which the greatest activity in the shifting of the luminous lines occur. The clips may be left permanently in these positions, or used as markers for indicating the points for the application of a conducting paint or coating as illustrated in Fig. 1. The number of clips employed will depend upon the length of the tube. They may be connected by a wire as in Fig. 3, giving the same luminous effect as described in connection with Figs. 2 and 3, or they may be individually grounded giving substantially the same result. An additional clip is shown at 7ª in dotted lines.

In Fig. 6, a patch 8 of fine wire mesh is shown applied to the tube at one end of the portion containing the filler, and this is shown with a ground connection 9. The visible effect of this arrangement is to speed up the shifting action of the light lines and if a similar conducting medium be attached to the opposite end of the portion of the tube containing the filler and grounded, the visible effect on the shifting of the light lines will be the same as that described in connection with Fig. 2.

In Figs. 8 and 9, I have shown a filler consisting of star-shaped blocks of glass 11, each having a plurality of through openings 12, the successive blocks being spaced apart and arranged with their points and the openings in staggered relation, affording a plurality of devious courses for the electrical discharge. This arrangement has proved very satisfactory and is illustrated and described in my application before mentioned. The spaces 11ª between the successive points in each block constitute grooves of equal length and cross-section extending longitudinally of the tube.

In all of the tubes shown in the drawing, the conducting medium on or adjacent the outer surface of the tube serves as one conductive element of a condenser, the other conductive element being the electrified gas which is affected by the action of the condenser and causes a change in the shifting movement of the transformer current passing through the devious paths afforded by the filler. Very many different conductive materials may be used for this external capacity circuit, and good results may be obtained with materials that are only slightly conductive. Conductive materials of relatively low resistance are preferred for the best results. Usually the material will be applied as a coating to the tube, and the area and places covered will be varied as desired. Good results may be obtained by placing the conductive material near the tube and not in actual contact with it, as illustrated by the insulated wire in Fig. 4. Different tubes may require different treatment to produce desired results and the conductive material will be placed wherever necessary. It may be applied in patches at desired points or extended throughout the length of the part of the tube containing the filler. The glass envelopes containing the filler may be of tubular form as illustrated in the drawing or they may have various shapes, such as bulbs.

What I claim is:

1. A luminous discharge device comprising a closed glass envelope containing a rare gas and spaced electrodes and a filler of insulating material within that part of the envelope which lies between said electrodes, said filler affording a plurality of paths for the electrical discharge, and electrically conductive material arranged in contact with or closely adjacent the outer side of the envelope adjacent the portion thereof containing the filler, said material being insulated from the electrodes.

2. A luminous discharge device comprising a closed glass envelope containing a rare gas and spaced electrodes and a filler of insulating material within that part of the envelope which lies between said electrodes, said filler affording a plurality of tortuous paths for the electrical discharge, and electrically conductive material arranged in contact with or closely adjacent the outer side of the envelope adjacent the portion thereof containing the filler, said material being insulated from the electrodes.

3. A luminous discharge device comprising a closed glass tube containing a rare gas and spaced electrodes and a filler of insulating material within that part of the tube which lies between said electrodes, said filler affording a plurality of paths for the electrical discharge, and electrically conductive material arranged in contact with or closely adjacent the outer side of the tube at one end of the portion thereof containing the filler, said material being insulated from the electrodes.

4. A luminous discharge device comprising a closed glass tube containing a rare gas and spaced electrodes and a filler of insulating material within that part of the tube which lies between said electrodes, said filler affording a plurality of paths for the electrical discharge, and electrically conductive material arranged in contact with or closely adjacent the outer side of the tube at both ends of the portion containing the filler, said material being insulated from the electrodes.

5. A luminous discharge device comprising a closed glass envelope containing a rare gas and spaced electrodes and a filler of insulating material within that part of the envelope which lies between said electrodes, said filler affording a plurality of paths for the electrical discharge, and electrically conductive material arranged in contact with or closely adjacent the outer side of the envelope at various places spaced apart on the portion containing the filler, the conductive material being insulated from the electrodes and electrically connected together.

6. A luminous discharge device comprising a closed glass tube containing a rare gas and spaced electrodes and a filler of insulating material within that part of the tube which lies between said electrodes, said filler affording a plurality of paths for the electrical discharge, and electrically conductive material arranged in contact with or closely adjacent the outer side of the tube at both ends of the portion containing the filler, the conducting material at said ends being insulated from the electrodes and electrically connected together.

7. A luminous discharge device comprising a closed glass envelope containing a rare gas and spaced electrodes and a filler of insulating material within that part of the envelope which lies between said electrodes, said filler affording a plurality of paths for the electrical discharge, and electrically conductive material arranged in contact with or closely adjacent the outer side of the envelope at the portion thereof containing the filler, said material being insulated from the electrodes and grounded.

8. A luminous discharge device comprising a closed glass envelope containing a rare gas and spaced electrodes and a filler of insulating material within that part of the envelope which lies between said electrodes, said filler affording a plurality of paths for the electrical discharge, and a coating of electrically conductive material on the outer side of the envelope at the portion thereof containing the filler, said material being insulated from the electrodes.

9. A luminous discharge device comprising a closed glass envelope containing a rare gas and spaced electrodes and a filler of insulating material within that part of the envelope which lies between said electrodes, said filler affording a plurality of paths for the electrical discharge, and a coating of electrically conductive material on the outer side of the envelope at the portion thereof containing the filler, said coating being in spaced patches and insulated from the electrodes.

10. A luminous discharge device comprising a closed glass tube containing a rare gas and spaced electrodes and a filler of insulating material within that part of the tube which lies between said electrodes, said filler affording a plurality of paths for the electrical discharge, and a coating of electrically conductive material on the outer side of the tube at the portion thereof containing the filler, said coating extending substantially from end to end of said portion, and being insulated from the electrodes.

11. A luminous discharge device comprising a closed glass tube containing a rare gas and spaced electrodes and a filler of insulating material within that part of the tube which lies between said electrodes, said filler affording a plurality of paths for the electrical discharge, and one or more metal clips mounted on the tube at the portion thereof containing the filler.

12. A luminous electrical discharge device comprising a closed glass envelope containing a rare gas and spaced electrodes of solid material and a filler of insulating material within that part of the envelope which lies between said electrodes, said filler composed of units each having approximately the same cross-sectional dimension as that of the interior of the envelope, and having a plurality of grooves in its periphery for the passage of the electrical discharge.

13. A luminous discharge device comprising a closed glass envelope containing a rare gas and spaced electrodes and a filler of insulating material within that part of the envelope which lies between said electrodes, said filler affording a plurality of paths for the electrical discharge, and electrically conductive material arranged in contact with or closely adjacent the outer side of the envelope, said material being insulated from the electrodes.

14. A luminous discharge device comprising a closed glass envelope containing a rare gas and spaced electrodes and a filler of insulating material within that part of the envelope which lies between said electrodes, said filler affording a plurality of tortuous paths for the electrical discharge, and electrically conductive material arranged in contact with or closely adjacent the outer side of the envelope, said material being insulated from the electrodes.

15. A luminous discharge device comprising a closed glass envelope containing a rare gas and spaced electrodes and a filler of insulating material within that part of the envelope which lies between said electrodes, said filler affording a plurality of paths for the electric discharge, and electrically conductive material associated with the device and insulated from the electrodes forming a capacity circuit for influencing the course of the discharge.

16. A luminous electrical discharge device comprising a closed glass tube containing a rare gas and spaced electrodes of solid material and a filler of insulating material within that part of the tube which lies between said electrodes, said filler having approximately the same cross-sectional dimension as that of the interior of the tube and having a plurality of grooves in its periphery extending longitudinally of the tube for the passage of the electrical discharge.

17. A luminous electrical discharge device comprising a closed glass tube containing a rare gas and spaced electrodes of solid material and a filler of insulating material within that part of the tube which lies between said electrodes, said filler composed of a plurality of units, each unit having a plurality of substantially parallel passageways extending longitudinally of the tube for the electrical discharge.

18. A luminous electrical discharge device comprising a closed glass tube containing a rare gas and spaced electrodes of solid material and a filler of insulating material within that part of the tube which lies between said electrodes, said filler composed of a plurality of units, each unit having a plurality of substantially parallel passageways extending longitudinally of the tube, and of substantially uniform cross-section, for the electrical discharge.

19. A luminous electrical discharge device comprising a closed glass tube containing a rare gas and spaced electrodes of solid material and a filler of glass within that part of the tube which lies between said electrodes, said filler composed of a plurality of units, each unit having a plurality of substantially parallel passageways extending longitudinally of the tube for the electrical discharge.

20. A luminous electrical discharge device comprising a closed glass tube containing a rare gas and spaced electrodes of solid material and a filler of glass within that part of the envelope which lies between said electrodes, said filler composed of a plurality of units, each unit having a plurality of substantially parallel passageways extending longitudinally of the tube, and of substantially uniform cross-section, for the electrical discharge.

21. A luminous electrical discharge device comprising a closed glass tube containing a rare gas and spaced electrodes of solid material and a filler of insulating material within that part of the tube which lies between said electrodes, said filler composed of a plurality of units, each unit having approximately the same cross-sectional dimension as that of the interior of the tube, and each unit having a plurality of substantially parallel passageways extending longitudinally of the tube for the electrical discharge.

22. A luminous electrical discharge device comprising a closed glass tube containing a rare gas and spaced electrodes of solid material and a filler of glass within that part of the tube which lies between said electrodes, said filler composed of a plurality of units, each unit having approximately the same cross-sectional dimension as that of the interior of the tube, and each unit having a plurality of substantially parallel passageways extending longitudinally of the tube for the electrical discharge.

23. A luminous electrical discharge device comprising a closed glass envelope containing a rare gas and spaced electrodes of solid material and a filler of insulating material within that part of the envelope which lies between said electrodes, said filler affording a plurality of parallel passageways extending longitudinally of the envelope for the electrical discharge, and electrically conductive material associated with the device, for influencing the course of the discharge.

JOHN H. McCAULEY.